United States Patent

Sugikawa

[11] Patent Number: 6,165,640
[45] Date of Patent: *Dec. 26, 2000

[54] BATTERY CAN-FORMING PLATE AND BATTERY CAN

[75] Inventor: Hirofumi Sugikawa, Toyonaka, Japan

[73] Assignee: Katayama Special Industries, Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/858,894

[22] Filed: May 19, 1997

[30] Foreign Application Priority Data

May 21, 1996 [JP] Japan ..................................... 8-126163

[51] Int. Cl.$^7$ ........................................................ H01M 2/02
[52] U.S. Cl. ............................ 429/166; 429/164; 429/168
[58] Field of Search ............................... 429/164.66, 176, 429/168, 166, 164; 428/679, 684, 687; 420/8, 112

[56] References Cited

U.S. PATENT DOCUMENTS 4,838,955  6/1989  Edelman et al. ............................ 148/2
5,576,113 11/1996  Hirofumi ................................. 429/679
5,582,932 12/1996  Oltman et al. .......................... 429/176
5,603,782  2/1997  Sugikawa et al. ...................... 148/518
8,787,752  8/1998  Iwase et al. ............................. 72/349

FOREIGN PATENT DOCUMENTS 0 725 453  8/1996  European Pat. Off. .
0 732 758  9/1996  European Pat. Off. .
0 785 584  7/1997  European Pat. Off. .

OTHER PUBLICATIONS

Patent Abstracts of Japan, vol. 010, No. 248 (E–43), Aug. 26, 1986, abstracting JP 61 07849.

Primary Examiner—Carol Chaney
Assistant Examiner—Mark Ruthkosky
Attorney, Agent, or Firm—Sughrue, Mion, Zinn, Macpeak & Seas, PLLC

[57] ABSTRACT

A battery can-forming plate consisting of a steel plate plated with an alloy, wherein a hardness of a plated layer formed on one surface of the steel plate is higher than that of a plated layer formed one the other surface thereof. The plated layer having a higher hardness is used as an inner surface of a battery can and the plated layer having a lower hardness is used as an outer surface thereof in forming the battery can. The steel plate is plated with a nickel alloy.

21 Claims, 9 Drawing Sheets

RELATIONSHIP BETWEEN Ni-Mn ALLOY AND CONTENT OF Mn

RELATIONSHIP BETWEEN Ni-Fe ALLOY AND CONTENT OF Fe (COLD-ROLLED)

(SUCCESSIVELY ANNEALED)

(BATCH-ANNEALED)

(ROLLED)

BATTERY CAN-FORMING PLATE AND BATTERY CAN

BACKGROUND OF THE INVENTION

1. Field of the Invention

The present invention relates to a battery can-forming plate; a battery can-forming method using the battery can-forming plate; and a primary battery and a secondary battery formed by the battery can-forming method. More particularly, the present invention relates to a battery can having a rough inner surface and a mirror-like outer surface.

2. Description of Related Art

Batteries are used as the power source of the various kinds of cordless equipments such as personal lap-top computers, cellular telephones, and the like which are widely used in recent years. In the portable equipments, the space occupied by batteries is very large. In order to make the portable equipments compact and light, it is necessary to provide them with batteries which are compact and light, and yet have a high performance. Thus, battery cans are required to have a high capacity.

Generally, nickel-plated steel plates are used as the battery can. The following two methods, namely, transfer drawing method and drawing & ironing (hereinafter referred to as DI) method are used to form a cylindrical battery can, using the nickel-plated steel plate. In transfer drawing method, a circular blank punched from a nickel-plated steel plate is fed to a plurality of dies having different drawing diameters to draw the circular blank so as to form a cylindrical steel plate, as described in Examined Japanese Patent Publication No. 7-99686. In DI method, a steel plate was sequentially passed through dies which have different drawing diameters and are coaxially vertically arranged, with a punch applying pressure to the steel plate to obtain a cylindrical steel plate.

A conventional nickel-plated layer of a conventional battery can-forming plate has a low hardness. Thus, when a battery can is formed by the press drawing method, the plated layer follows the plasticity of the steel in drawing the steel plate, with the result that the inner surface of the side wall (peripheral wall) of the battery can is smooth. In order to allow the inner surface of the side wall of the battery to make a close contact with a positive pole substance and reduce the contact electric resistance of the inner surface, it is preferable that the inner surface of the battery can is rough and slightly crackled. However, because the inner surface of the battery can formed by press drawing method is smooth, the inner surface thereof does not contact the positive pole substance closely, thus having a great contact electric resistance.

In order to solve the above-described problems, the present applicant proposed a method of causing a plated layer to crack at the time of the press drawing operation by forming a plated layer having a high hardness. However, in this method, after the steel plate is nickel-plated, it is annealed and rolled for tempering, and then, a plated layer having a high hardness is formed on the side of the steel plate corresponding to the inner surface of the side wall of the battery can. That is, this method requires a large number of processes. Thus, this method causes the manufacturing cost to be high.

SUMMARY OF THE INVENTION

The present invention has been made in view of the above-described problems. It is accordingly an object of the present invention to form a cracked and rough surface on the side of a steel plate corresponding to the inner surface of a battery can at the time of press drawing operation without plating the steel plate twice and allow the side of the steel plate corresponding to the outer surface of the battery can to be mirror-like to provide the outer surface with a high corrosion-resistant property.

In order to solve the above-described problems, according to the present invention, a battery can-forming plate consists of a steel plate plated with an alloy. The hardness of a plated layer formed on one surface of the steel plate is higher than that of a plated layer formed one the other surface thereof; and the plated layer having a higher hardness is used as an inner surface of a battery can and the plated layer having a lower hardness is used as an outer surface thereof in forming the battery can.

The steel plate is plated with a nickel alloy; and the hardnesses of the plated layers are differentiated from each other by changing the content of a metal other than nickel, by using a different kind of metal, by adding an organic substance, and/or by varying the addition amount of the organic substance.

A alloy is selected from Ni—Mn, Ni—Co, Ni—Fe, Ni—Sn, Ni—Zn, Ni—B, Ni—Si, Ni—In, Ni—Ge, Ni—Se, Ni—La, Ni—W, Ni—Ti, Ni—P, Ni—Mo, Ni—Ga, Co—Mo, Fe—W, and Ag—Se.

As described above, the hardness of the alloy plating can be easily adjusted by varying the kind of an alloy or changing the mixing amount of the alloy. For example, in nickel alloy plating, the hardness of the nickel alloy plating can be increased by varying the kind of metal to be added to nickel and adjusting the amount of the metal. Further, the hardness of the nickel alloy plating can be also increased by adding an addition such as organic substance to a plating bath. Generally, plating having a low hardness can be accomplished by annealing a steel plate and rolling it for tempering, whereas the addition of an additive such as an organic substance to a plating bath increases the hardness of a plated layer to about twice as high as a plated layer not containing the additive.

The inner surface of a cylindrical battery can can be cracked randomly lengthwise, widthwise, and obliquely when an alloy-plated layer having a high hardness is formed on the side of the steel plate corresponding to the inner surface of the cylindrical battery can formed by press drawing in transfer drawing method or DI method. Consequently, the surface area of the inner surface of the battery can can be allowed to be large and the area of contact between the inner surface and positive pole substance (active substance) becomes great, which contributes to the reduction in the contact resistance of the inner surface of the battery can and to the reduction in the internal resistance of the battery. That is, the performance of the battery can be improved. A plated layer having a lower hardness is formed on the side of the steel plate corresponding to the outer surface of the battery can so as to prevent the plated layer from being cracked as a result of the elongation of the steel plate and the plated layer at the time of press drawing. Thus, the battery can is allowed to have a mirror-like outer surface which improves the corrosion-resistant property and damage-resistant property.

Preferably, the steel plate plated with an alloy consists of a high yield strength steel plate having characteristics that the YP (yielding point) thereof is not less than 250 N/mm$^2$ and not more than 700 N/mm$^2$ and that the HR30T (hardness) thereof is not less than 55 and not more than 80.

The high yield strength steel plate consists of the steel plates of T-3 through T-5 and DR-8 through DR-10 of JIS G 3303. The bottom wall of the battery can is required to have a strength and a rigidity high enough to withstand the internal pressure of the battery can. The above high yield strength steel plates have a strength and a rigidity almost equal to those of the steel plates of T-1 and T-2 even though the thickness of the former is smaller than the latter by about 25%. In other words, the thickness of the high yield strength steel plate can be reduced by 25%. Thus, the capacity of the battery can can be increased that much and the performance of the battery can be improved.

Preferably, the crystal grain of the steel plate plated with an alloy is in a range of 10–12. The crystal grain of the battery can-forming plate is flat and arranged in rows linearly.

By using the steel plate having a small grain size, the steel plate itself can be prevented from being roughened or the generation of a rough surface can be reduced to a small degree. Because the surface of the steel plate corresponding to the inner side of the battery can is plated with an alloy having a higher hardness, the alloy-plated layer does not follow the elongation of the steel plate favorably. Thus, the surface of the alloy-plated layer can be roughened and cracked when the steel plate is drawn. On the other hand, because the surface of the steel plate corresponding to the outer surface of the battery can is plated with an alloy having a lower hardness, the alloy-plated layer follows the elongation of the steel plate favorably. Thus, when a rough surface is generated on the steel plate, the alloy-plated layer is also roughened. But as described above, because the steel plate is not roughened, the alloy-plated layer is not roughened either. Thus, the surface of the steel plate corresponding to the outer surface of the battery can can be formed as a mirror-like surface.

Preferably, the surface of the plated layer having the higher hardness is plated with a metal selected from Au, Ag, Mo, Co, Ir, Rh, W, and Zn having a small contact electric resistance. That is, the steel plate corresponding to the inner surface, of the battery can, which requires to be plated at a higher hardness is plated with a metal having a small contact resistance at the time of press drawing to allow the area of contact between the inner surface and an active substance to be great, which contributes to the reduction in the contact resistance of the battery can and to the improvement of the performance of the battery.

Preferably, one surface of the steel plate is processed as a rough surface, whereas the other surface thereof is processed as a mirror-like surface; and the plated layer having the higher hardness is formed on the rough surface, and the plated layer having the lower hardness is formed on the mirror-like surface.

In order to obtain a steel plate, one surface of which is rough and the other surface of which is mirror-like, the steel plate is rolled by passing it through a pair of rolling rollers, the upper one of which is polished with a grindstone and the lower of which is a bright roll. Such a steel plate becomes U-shaped when the roughness degree of the rough surface is great. Therefore, preferably, the steel plate is passed through a leveler after it is rolled to make it flat.

As described above, by forming a plated layer having a higher hardness on a rough surface of the steel plate, the area of the inner surface of the battery can formed by press drawing can be increased and the inner surface can be easily roughened and cracked. On the other hand, by forming a plated layer having a lower hardness on the mirror-like surface of the steel plate, the outer surface of the battery can can be allowed to have a mirror-like surface.

Preferably, the roughness of the rough surface is in a range of Ra 10 $\mu$m to 0.15 $\mu$m. That is, the inner surface of the battery can having a roughness degree of less than 0.15 $\mu$m is not effective for generating cracks or roughness. If the inner surface has a roughness degree of more than 10 $\mu$m, there is a possibility that an electrolyte leaks from a sealing portion of the battery can. When the inner surface has a roughness degree of less than 10 $\mu$m, the thickness of the sealing portion can be allowed to be greater than that of the side wall of the battery can by compression processing. As a result, the sealing portion can be made to be smooth, thus preventing the leakage of the electrolyte. For example, in a unit-3 battery can, when the thickness of the bottom wall is set to 0.25 mm, that of the side wall is set to 0.20 mm, and that of the sealing portion is set to 0.25 mm by compression processing, the battery can can be caulked with a cover at a high strength. Thus, the leakage of the electrolyte can be prevented.

Preferably, a strike plating layer is formed between the alloy-plated layer and the steel plate. The strike plating layer is formed on both surface of the steel plate in the same hardness. Even though the inner surface of the battery can is cracked, the strike plating layer formed between the steel plate and the alloy-plated layer follows the elongation of the steel plate, thus preventing the strike plating layer from being cracked. Therefore, the corrosion-resistant property of the battery can is prevented from being deteriorated.

Further, in the present invention, there is provided a method of forming a battery can having cracks in a random direction on an inner surface of a battery can plated with an alloy having a higher hardness by press processing. As the press processing, a transfer drawing method of drawing a steel plate into a cylindrical shape by sequentially feeding the steel plate to dies having different drawing diameters, DI method of drawing and ironing the steel plate into a cylindrical shape by successively feeding the steel plate to dies having different drawing diameters and coaxially vertically arranged, with a punch applying a pressure to the steel plate; or a method of passing the steel plate through an ironing and drawing die after the steel plate is drawn by transfer drawing method is used.

Further, there is provided a battery can having an inner surface of a side wall thereof, in which cracks are generated in a random direction in press processing. That is, the construction of the battery can-forming plate is not limited to a specific one, but the present invention includes a battery can formed of the alloy-plated steel plate and having cracks on the surface of the alloy-plated layer formed on the inner surface of the battery can.

Further, there is provided a battery can consisting of the battery can-forming plate described above processed into a cylindrical shape or a rectangular cylindrical shape by the method described above, wherein cracks generated in a random direction in press processing are formed on a hard plated layer formed on an inner surface of a side wall of the cylinder.

The thickness of the side wall and that of the plated layer formed thereon are smaller than that of the bottom wall and that of the plated layer formed thereon, respectively. That is, in the battery can, the thickness of the bottom wall is limited to a specified one to withstand the internal pressure of the battery can. In order to increase the capacity of the battery can, preferably, the thickness of the side wall is set to be smaller than that of the bottom wall. When DI method is adopted, the side wall is thinner than the bottom wall.

DESCRIPTION OF THE PREFERRED EMBODIMENTS

The embodiments of the present invention will be described below with reference to drawings.

Figure 1:
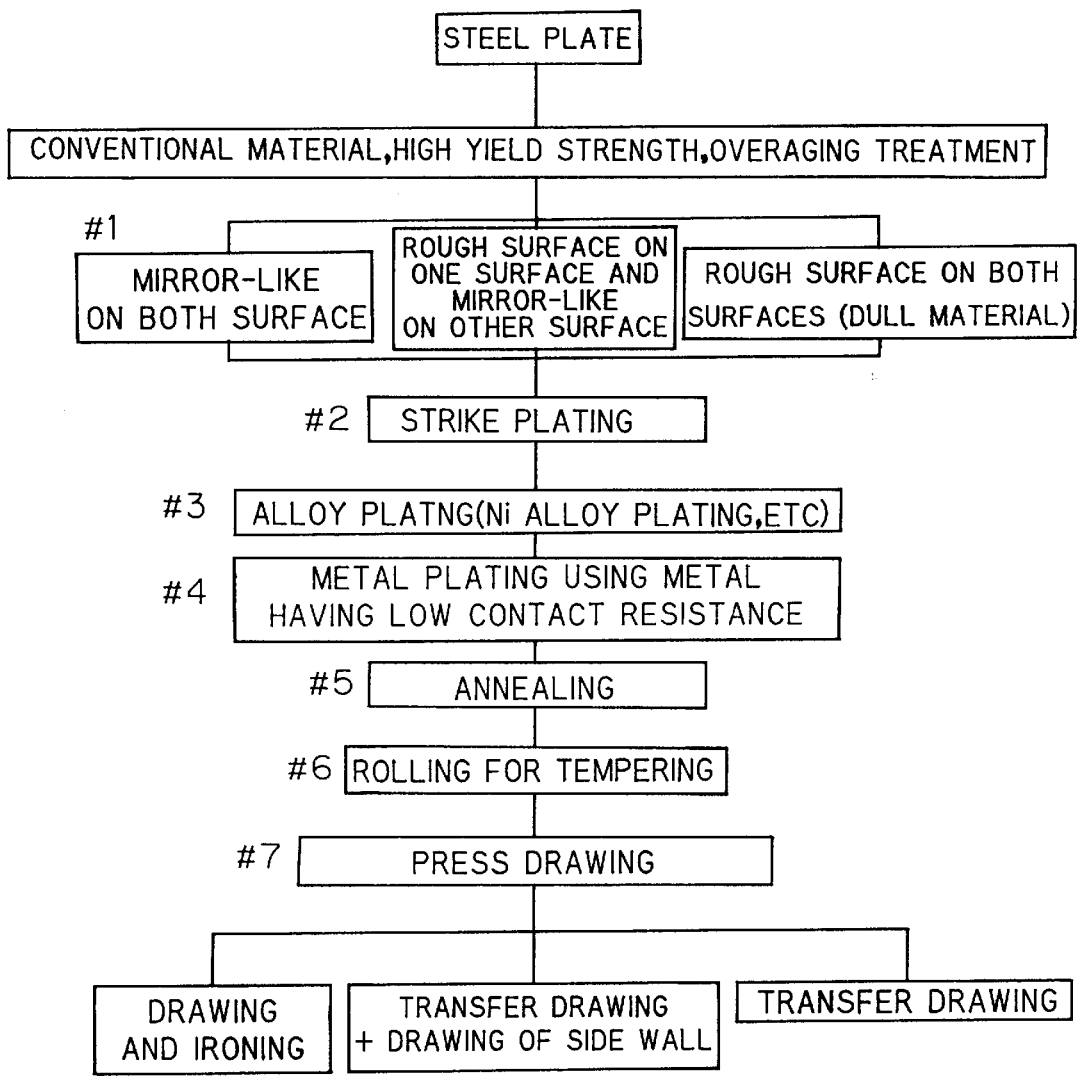
FIG. 1 is a view showing the process of forming a battery can-forming plate of the present invention and forming a battery can using the battery can-forming plate.

FIG. 1 schematically shows the flow of the process of forming a battery can for use in a primary battery or a secondary battery. With reference to FIG. 1, the process of forming the battery can of a steel plate will be schematically described below.

As steel plates to be used as the material of the battery can, three kinds of steel plates are used. The first material consists of a conventional material, for example, steel plates of T-1 and T-2 of JIS G 3303 used as a battery can-forming material. The second material consists of high yield strength steel plates of T-3 through T-5 and DR-8 through DR-10 of JIS G 3303 having mechanical characteristics that the YP (yielding point) thereof is not less than 250 N/mm² and not more than 700 N/mm² and the HR30T (hardness) thereof is not less than 55 and not more than 80. The third material consists of steel plates having a grain size of 10–12 obtained by averaging treatment or consists of steel plates composed of flat crystal grains having the grain size of 10–12 and arranged in rows linearly. The second and third steel plates have not been hitherto used as a battery can-forming material. The combination of the second and third steel plates and the steel plates having the grain size of 10–12 are preferably used.

As shown in step #1 of FIG. 1, depending on the finished surface state obtained at the rolling processing of steel plates, the surface of a steel plate of each of the above-described three kinds of steel plates is treated as follows: In the first case, both surfaces of the steel plate are processed into a mirror-like surface finish; in the second case, one surface thereof is processed into a mirror-like surface finish and the other surface is processed into a rough surface finish; in the third case, both surfaces thereof are processed into rough surface finish. In the first case, the steel plate is rolled by passing it through a pair of bright rolling rollers. In the second case, the steel plate is rolled by passing it through a pair of rolling rollers, the upper one of which is polished with a grindstone and the lower of which is a bright roll. In the third case, the steel plate is rolled by passing it through a pair of rolling rollers both polished with a grindstone. The surface of the above three kinds of steel plates can be processed into the three kinds of finish states. Thus, there are nine kinds of surface states available on the surface of the steel plates.

At step #2, the nine kinds of steel plates are strike-plated (that is, ground plating are applied). As the strike plating, the steel plate is plated with nickel by watts bath to form a nickel-plated layer having the same degree of hardness on both surfaces of each steel plate. The strike-plating at step #2 may be omitted.

At step #3, the strike plated plate is plated with an alloy. In the alloy plating, the hardness of the plated layer to be formed on the upper surface of the steel plate and that to be formed on the lower layer thereof are differentiated from each other to use the plated layer having a higher hardness as the inner surface of a battery can and the plated layer having a lower hardness as the outer surface thereof. As the alloy plating, nickel alloy plating is used in this embodiment. The hardnesses of the plated layers are differentiated by changing the content of a metal other than nickel, by using a different kind of metal, by adding an organic substance, and by varying the addition amount of the organic substance when both surface are plated with metal including the organic substance.

In the alloy plating, the following nickel alloys are preferably used: Ni—Mn, Ni—Co, Ni—Fe, Ni—Sn, Ni—Zn, Ni—B, Ni—Si, Ni—In, Ni—Ge, Ni—Se, Ni—La, Ni—W, Ni—Ti, Ni—P, Ni—Mo, and Ni—Ga. As alloys other than the nickel alloys, alloys of Co—Mo, Fe—W, and Ag—Se are also preferably used.

At step #4, it is preferable to plate the nickel-plated or alloy-plated surface with a metal selected from Au, Ag, Mo, Co, Ir, Rh, W, and Zn having a small contact electric resistance. The plating process at step #4 is not essential but performed as necessary.

That is, it is possible to achieve the object of the present invention, i.e., it is possible to form a rough surface or cracks on the inner surface of the battery can and a smooth surface on the outer surface thereof, by merely plating both surfaces of the steel plate consisting of the conventional material with an alloy at step #3 in forming the battery can by press drawing processing.

Then, at step #5, the steel plate plated thus is annealed, and at step #6, the steel plate is roller for tempering. The annealing process at step #5 and rolling process for tempering at step #6 are not essential but performed as necessary.

At step #7, press drawing is applied to the battery can-forming plate manufactured from step #1 through #6 to form a cylindrical battery can having a bottom. As the press drawing processing, any one of three methods described below is adopted: First method: transfer drawing method, second method: DI method, and third method: after the battery can-forming plate is drawn by transfer drawing method, the battery can-forming plate is passed through a die for ironing the portion of the battery can-forming plate corresponding to the side wall of the battery can. The first and second methods are hitherto used, whereas the third method is novel.

Any of the first through third methods are capable of forming a rough surface on the inner side of the battery can for use in primary and secondary batteries in the drawing operation to reduce the contact electric resistance of the inner surface of the battery can thereby to improve the performance of the battery. This is because the alloy-plated layer having different degrees of hardness is formed on both surfaces of the steel plate at step #3. The outer surface of the battery can is allowed to be mirror-like to improve corrosion-resistant property and damage-resistant property.

Referring to FIG. 1, the steel plate serving as the material of the battery can can be selected from the three kinds of steel plates, and three kinds of surface finish states can be selected at step #1. As described previously, the operations at step #2 and step #4 through #6 are carried out as necessary. Further, the drawing method is carried out at step #7 by selecting one method from the above-described three methods. As apparent from the foregoing description, in the present invention, the alloy-plating process which is performed at step #3 is most important. Important processes are described below sequentially in detail. First of all, the process to be executed at step #3 is described below.

Description is made on the formation of the alloy-plated layer on both surfaces of the steel plate at step #3 which is most important.

The hardness of the alloy-plated layer can be adjusted more easily in the alloy plating than in single metal plating. As described previously, in the case of the nickel alloy plating, the hardness of the plated layer can be easily adjusted by varying the content of a metal other than nickel or selecting a desired kind of metal; adding an organic substance to a plating bath; and varying the addition amount of the organic substance to the plating bath. Accordingly, it is easy to make the hardness of the side of the steel plate corresponding to the inner surface of the battery can higher and that of the side of the steel plate corresponding to the outer surface thereof lower, by differentiating the hardnesses of the plated layers to be formed on both surfaces of the steel plate from each other. Description is made below on experiments in which the hardness of each plated layer was measured when the amount of each alloy was varied and when an organic substance was added to plating baths and not added thereto.

In a first experiment, a steel plate was plated with a Ni—Mn alloy; in a second experiment, a steel plate was plated with a Ni—Co alloy; and in a third experiment, a steel plate was plated with a Ni—Fe alloy. The plating bath and plating condition of each of the first through third experiments are as shown in table 1 through table 3 shown below, respectively. It is to be noted that the amount of manganese sulfate shown in table 1, the amount of cobalt sulfate shown in table 2, and the amount of ferrous sulfate shown in table 3 were varied and the amounts of other substances were not changed.

TABLE 1

| Composition of Plating Bath | | | | | |
|---|---|---|---|---|---|
| Nickel sulfate | 280 g/l (liter) | " | | | |
| Nickel chloride | 30 g/l (liter) | " | | | |
| Manganese sulfate | 10 g/l | 25 g/l | 50 g/l | 100 g/l | |
| Formic acid | 50 g/l | " | | | |
| Boric acid | 45 g/l | | | | |

TABLE 1-continued

| Composition of Plating Bath | | | | |
|---|---|---|---|---|
| (additive for high hardness plating 28 cc/l) | | | | |
| Added only for high hardness plating | | | | |
| Content of Mn | 0.023% | 0.047% | 0.053% | 0.078% |
| Plating condition | | | | |
| Bath temperature: 60° C.   Ph: 4.2   Current density: 40 A/dm$^2$ | | | | |

TABLE 2

| Composition of Plating Bath | | | | |
|---|---|---|---|---|
| Nickel sulfate | 280 g/l (liter) | | | |
| Nickel chloride | 30 g/l (liter) | | | |
| Cobalt sulfate | 2.5 g/l | 5 g/l | 10 g/l | 28 g/l |
| Formic acid | 50 g/l | | | |
| Boric acid | 45 g/l | | | |
| Formalin | 2 cc/l | | | |
| (additive for high hardness plating 28 cc/l) | | | | |
| Added only for high hardness plating | | | | |
| Content of Co | 2.5% | 3.94% | 8.29% | 18.0% |
| Plating condition | | | | |
| Bath temperature: 60° C.   pH: 4.2   Current density: 40 A/dm$^2$ | | | | |

TABLE 3

| Composition of Plating Bath | | | | |
|---|---|---|---|---|
| Nickel sulfate | 180 g/l (liter) | | | |
| Nickel chloride | 60 g/l (liter) | | | |
| Ferrous sulfate | 0 g/l | 5 g/l | 10 g/l | 15 g/l |
| Ammonium sulfate | 30 g/l | | | |
| Boric acid | 30 g/l | | | |
| Ferroalloy S | 10 ml/l | | | |
| Ferroalloy B | 100 ml/l | | | |
| Content of Fe | 0.9% | 10.9% | 21.4% | 25.8% |
| Plating condition | | | | |
| Bath temperature: 60° C.   pH: 3.3   Current density: 10 A/dm$^2$ | | | | |

Figure 2:
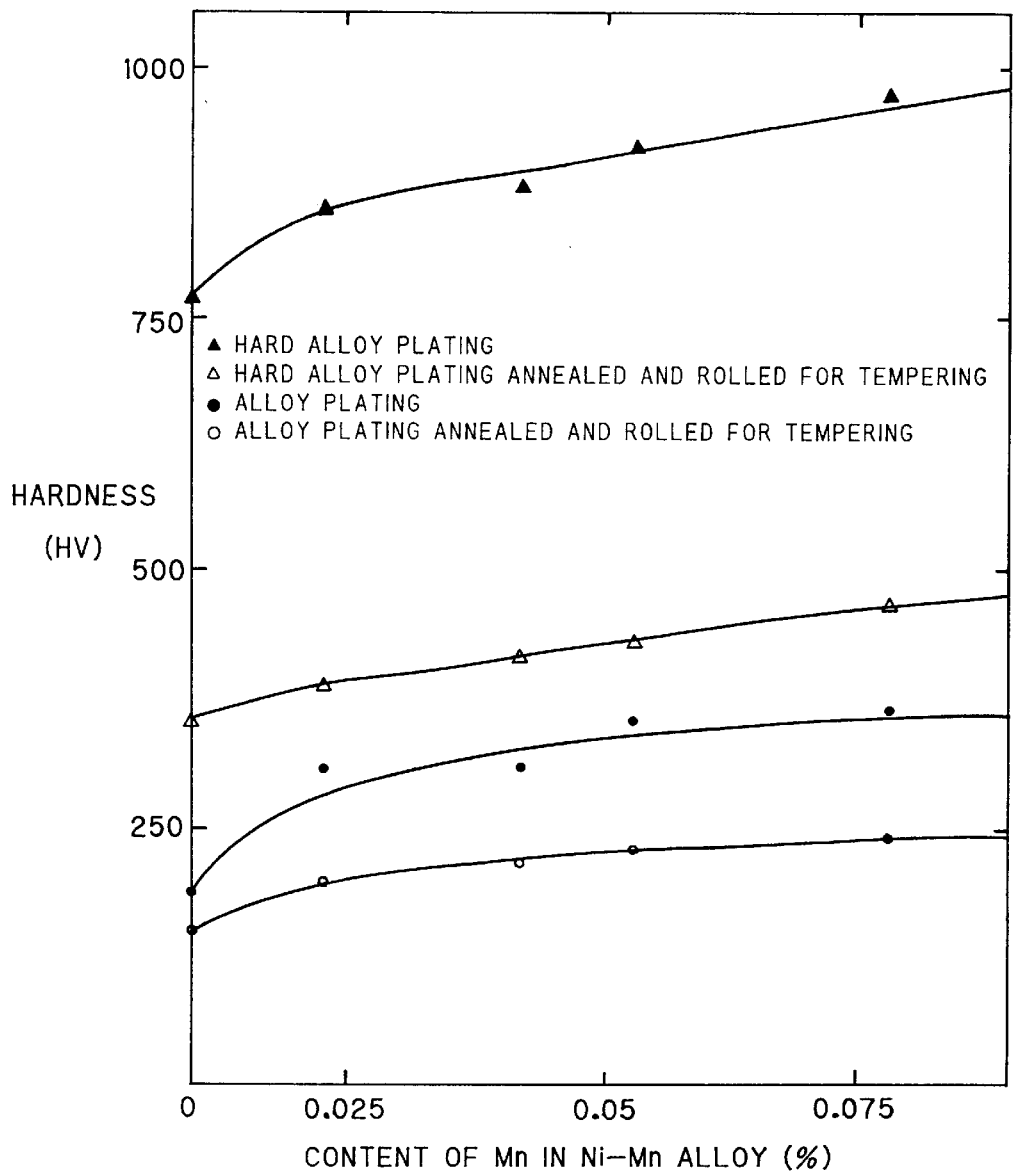
FIG. 2 is a diagram showing the hardness of a Ni—Mn alloy which is formed on a steel plate serving as the battery can-forming plate.
Figure 3:
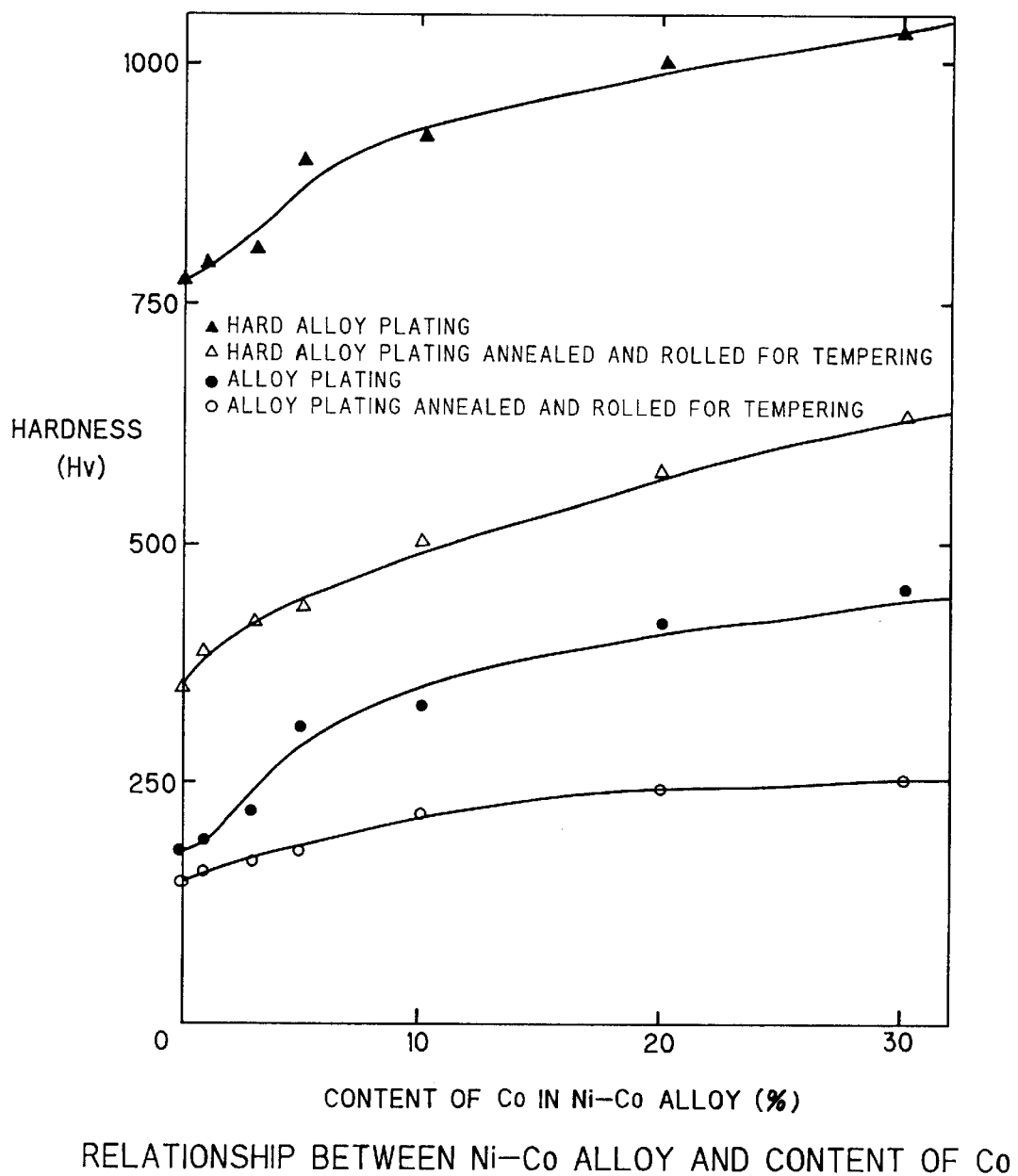
FIG. 3 is a diagram showing the hardness of a Ni—Co alloy which is formed on a steel plate serving as the battery can-forming plate.
Figure 4:
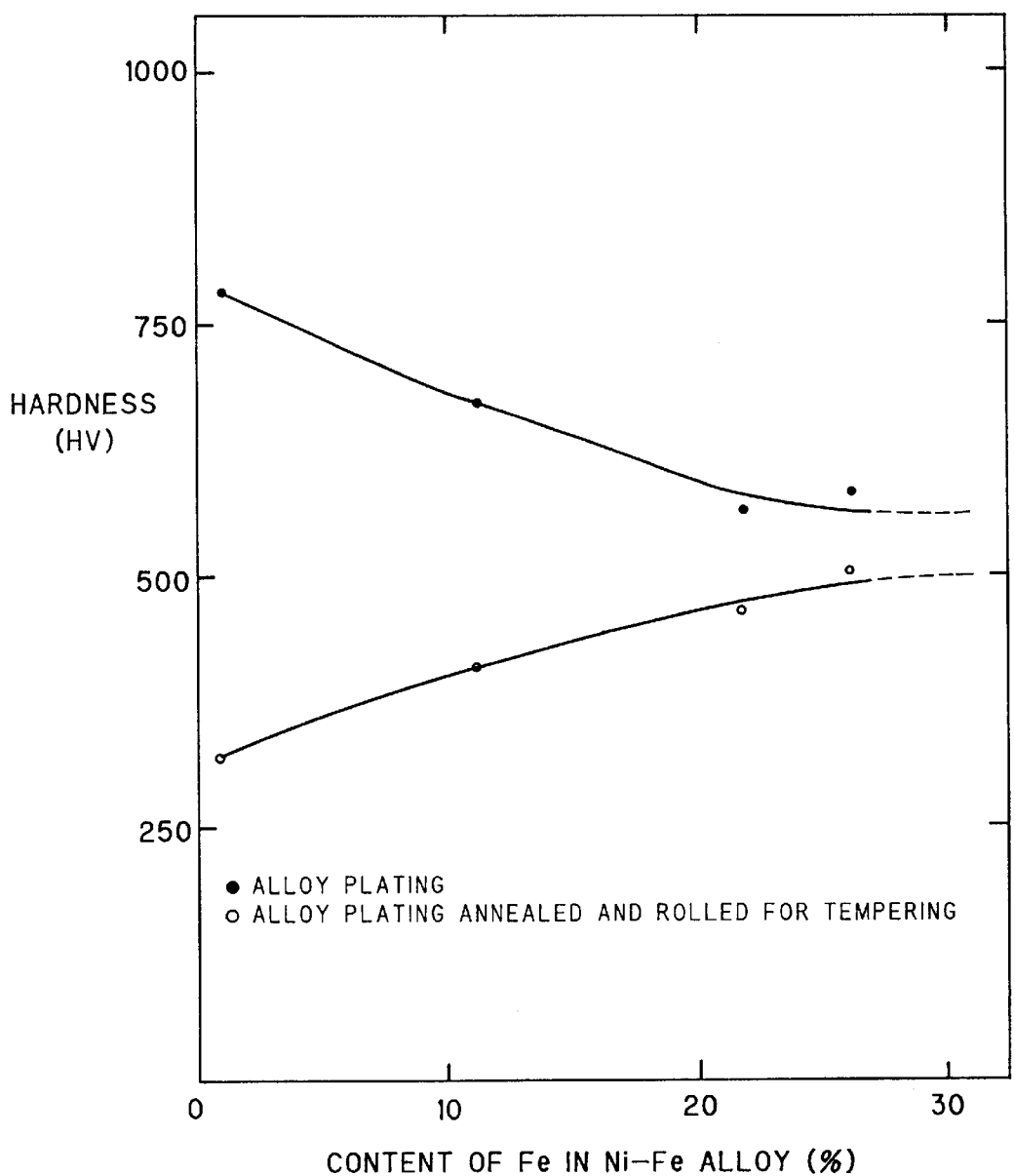
FIG. 4 is a diagram showing the hardness of a Ni—Fe alloy which is formed on a steel plate serving as the battery can-forming plate.

Plated foils were formed, using plating baths consisting of the composition of the first experiment in which the steel plate was plated with the Ni—Mn alloy, the composition of the second experiment in which the steel plate was plated with the Ni—Co alloy, and the composition of the third experiment in which the steel plate was plated with the Ni—Fe alloy. In the composition of each of the first through third experiments, the amount of each of Mn, Co, and Fe was varied as shown in each table. The hardness of each plated foil was measured. The result is shown in FIGS. 2, 3, and 4 in which lines connecting solid white circles with each other indicate the case in which after the steel plate was plated with the alloy, it was annealed and rolled for tempering; and lines connecting solid black dots with each other indicate the case in which after the steel plate was plated with the alloy, it was not annealed or rolled for tempering. In FIGS. 2 and 3, lines connecting solid white triangles with each other indicate the case in which after the steel plate was plated with the alloy at a high hardness by adding an additive to each plating bath, it was annealed and rolled for tempering; and lines connecting solid black triangles with each other indicate the case in which after the steel plate was plated with the alloy at a high hardness by adding the additive to each plating bath, it was not annealed or rolled for tempering. In accordance with JIS Z 2244, the hardness (Hv) of 150 μm (sectional length) of each plated foil was measured at 50 g/10 s.

As shown in FIGS. 2 and 3, in the case of only Ni (content: 0%), the hardness was lowest. The hardness becomes higher as the amount of metals Mn, Co, and Fe to be added to the plating bath increases. When the steel plate is annealed and rolled for tempering after it is plated, the hardness decreases. The hardness becomes outstandingly high when an additive consisting of an organic substance is added to the plating bath. As indicated by the measured result, it was confirmed that in plating both surfaces of the steel plate with an alloy, alloy-plated layers having different degrees of hardness can be formed by varying the amount of metals Mn, Co, and Fe to be added to the plating bath. It was also confirmed that in plating both surfaces of the steel plate with an alloy, alloy-plated layers having different degrees of hardness can be formed depending on whether an organic substance is added to the plating bath.

Based on the above-described result, in the first embodiment, at step #3, both surfaces of a steel plate having a thickness of 0.25 mm were plated with the Ni—Mn alloy in a thickness of 3 $\mu$m by setting the content of Mn to 0.053% at the side of the steel plate corresponding to the inner surface of the battery can and 0.023% at the side thereof corresponding to the outer surface thereof with condition as shown in table 4.

TABLE 4

| | Composition at inner side | Composition at outer side |
|---|---|---|
| Nickel sulfate | 280 g/l (liter) | " |
| Nickel chloride | 30 g/l (liter) | " |
| Manganese sulfate | 50 g/l | 10 g/l |
| Formic acid | 50 g/l | " |
| Boric acid | 45 g/l | " |
| Content of Mn | 0.053% | 0.023% |
| Plating condition | | |
| Bath temperature: 60° C. pH: 4 Current density: 40 A/dm$^2$ | | |

Figure 5:
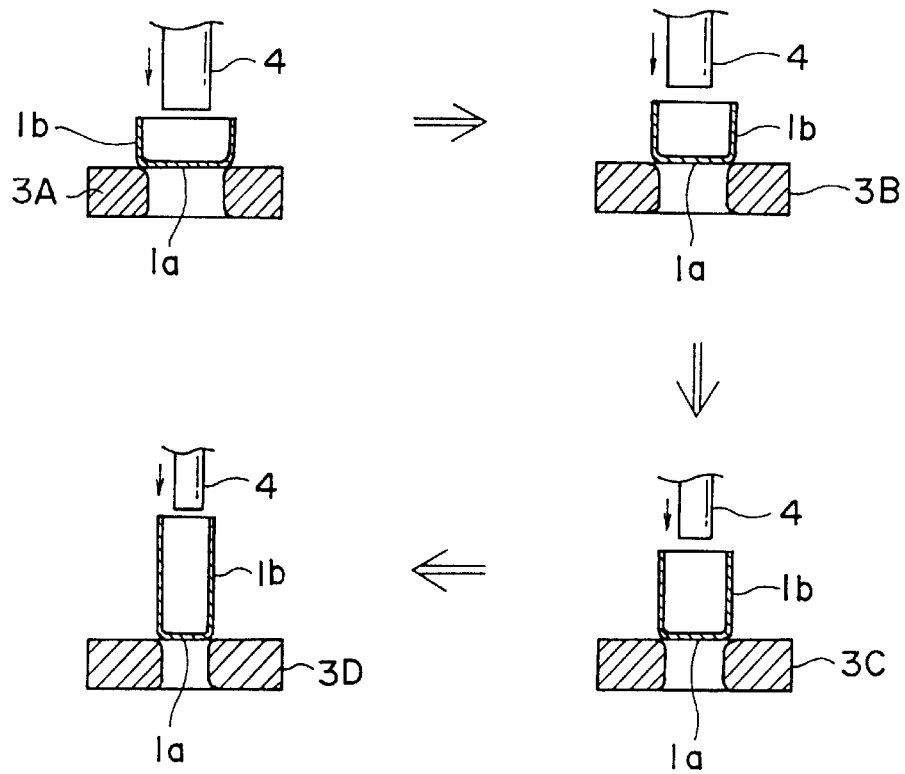
FIG. 5 is a schematic view showing transfer drawing method.
Figure 6A:
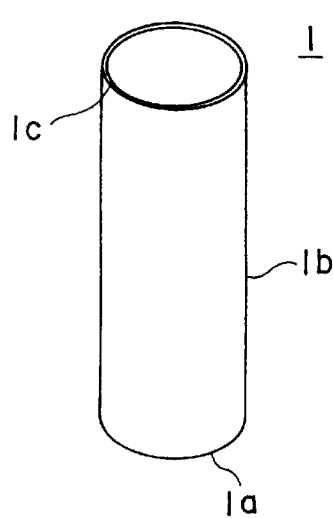
FIG. 6A is a perspective view showing a cylindrical battery can.

Using the steel plate plated with the Ni—Mn alloy of the first embodiment, transfer drawing processing was performed as shown in FIG. 5. That is, the steel plate was cut circularly to form a blank. Then, the blank was pressed by a punch 4 by sequentially feeding it to dies 3A–3D to draw it so as sequentially reduce the diameter of a bottom wall 1$a$ and increase the height of a side wall 1$b$. In this manner, the blank was processed into a cylindrical battery can 1 having the bottom wall as shown in FIG. 6A.

The average surface roughness degrees of 10 battery cans 1 was Ra 0.43 $\mu$m on the outer surface of a side wall 1$b$ thereof and Ra 4.6 $\mu$m on the inner surface of the side wall 1$b$ thereof. That is, the inner surface of the side wall 1$b$ was about 10 times as rough as the outer surface thereof. The outer surface thereof was drawn to a mirror-like surface finish.

In the second embodiment, the plating bath, similar to that of the first embodiment, used to plate the inner surface of the side wall of the battery can contained an additive 12 cc/liter consisting of an organic substance so as to process the inner surface thereof into semi-gloss finish. The side of the steel plate corresponding to the outer surface of the side wall of the battery can was plated with an alloy, similarly to the first embodiment. Similarly to the first embodiment, both surfaces of the steel plate were plated with the alloy in a thickness of 3 $\mu$m.

Using the plated steel plate similar to the second embodiment, battery cans were formed by transfer drawing method, similarly to the first embodiment to measure the surface roughness degree. The surface roughness degree of the inner surface of the side wall of the battery can was Ra 5.7 $\mu$m and cracks occurred randomly thereon lengthwise, widthwise, and obliquely. The surface roughness degree of the outer surface of the side wall of the battery can was Ra 0.43 $\mu$m, similarly to the first embodiment. As indicated by the result, it was confirmed that the surface roughness degree of the inner surface of the battery can became more than 11 times as large as that of the outer surface thereof by increasing the content of the alloy, adding the organic substance, and processing the steel plate by transfer drawing method.

Figure 7:
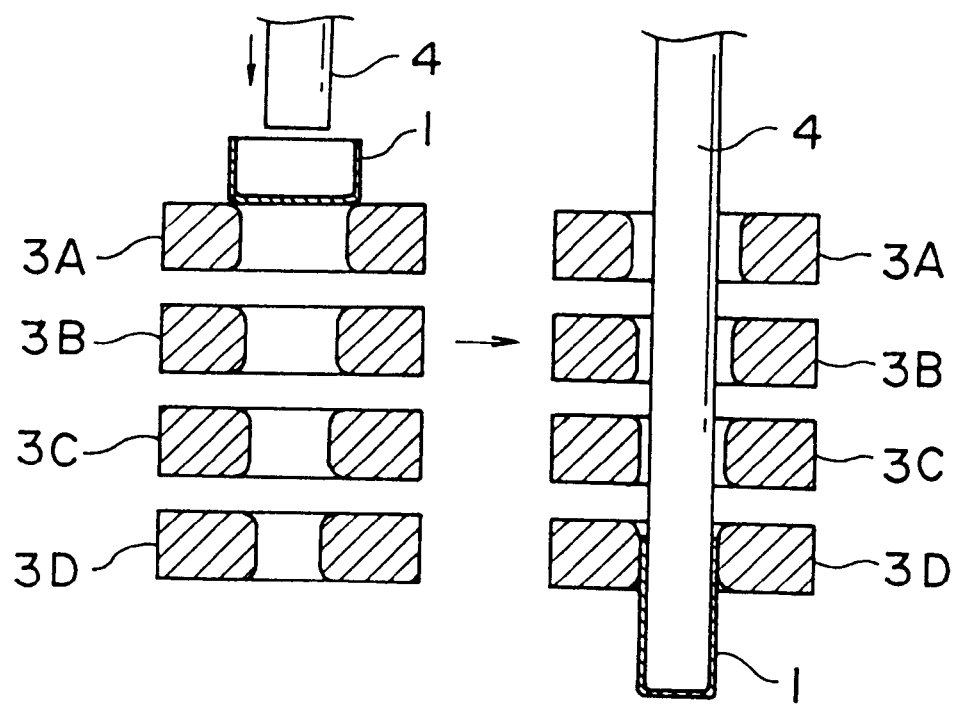
FIG. 7 is a schematic view showing DI drawing method.

As a first comparison sample to be compared with the second embodiment, battery cans in the same shape were formed by DI method shown in FIG. 7, using the same alloy-plated steel plate as that of the second embodiment. That is, in DI method, a blank cut off from the steel plate circularly is pressed by a punch 4 by successively feeding it to dies 3A–3D having different drawing diameters and coaxially vertically arranged. The surface roughness degree of the inner surface of the side wall of the battery can was Ra 0.1 $\mu$m and that of the outer surface of the side wall thereof was Ra 0.09 $\mu$m. That is, no roughness occurred on the inner and outer surfaces of the side wall of the battery.

In the third embodiment devised based on the first comparison sample, the inner surface of the battery can was roughened and was crackled by DI method. That is, the plating bath, which is applied to the side of the steel plate corresponding to the inner surface of the side wall of the battery can, is contained 28 cc/liter of an additive consisting of an organic substance in addition to the composition contained in the plating bath of the first embodiment to process the inner surface into a mirror-like glossy finish. Similarly to the first embodiment, the side of the steel plate corresponding to the outer surface of the side wall of the battery can was plated with an alloy, similarly to the first embodiment. Similarly to the first embodiment, both surfaces of the steel plate were plated with the alloy in a thickness of 3 $\mu$m.

Using the plated steel plate similar to the third embodiment, battery cans were formed by DI method, similarly to the first comparison sample to measure the surface roughness degree. The surface roughness degree of the inner surface of the side wall of the battery can was Ra 0.31 $\mu$m and cracks occurred randomly thereon lengthwise, widthwise, and obliquely. The surface roughness degree of the outer surface of the side wall of the battery was Ra 0.09 $\mu$m, similarly to the first comparison sample. That is, DI method was not capable of allowing the surface roughness degree of the inner surface of the side wall of the battery can to be so large as transfer drawing method, but allowed the surface roughness degree of the inner surface of the side wall to be greater by more than three times than the outer surface of the side wall.

Unlike the first through third embodiments in which both surfaces of the steel plate were plated with a nickel alloy, as a second comparison sample, a battery can-forming plate was formed by plating nickel both surfaces of a steel plate as same as conventional plating. Battery cans were formed by transfer drawing method and DI method. The plating bath consisted of 280 g/liter of nickel sulfate, 30 g/liter of nickel chloride, and 45 g/liter of boric acid. The plating condition was that 60° C. in temperature, 40 A/dm$^2$ in current density, and 4.2 in pH. Both surfaces of the steel plate were plated in a thickness of 3 $\mu$m, using the above plating bath.

Using the nickel-plated steel plate, battery cans in the same shape as that of the first through third embodiments were formed by transfer drawing method. The surface roughness degree of the inner surface of the side wall of the battery can was Ra 0.37 μm. The surface roughness degree of the inner surface of the battery can was Ra 0.08 μm by drawing and ironing method. The inner surface of the nickel-plated steel plate was smooth, i.e., no rough cracked surface was not formed.

In the first through third embodiments, the hardness of the alloy-plated layer on one side of the steel plate and that of the alloy-plated layer on the other side thereof were differentiated from each other by changing the content of the same kind of alloys. But it is possible to use different kind of alloy to form an alloy-plated layer having a high hardness on the inner surface of the steel plate and an alloy-plated layer having a low hardness on the outer surface thereof. The following alloys can be preferably applied to both surface of the steel plate in combination with one having a high hardness and one having a low hardness. Ni—Mn, Ni—Co, Ni—Fe, Ni—Sn, Ni—Zn, Ni—B, Ni—Si, Ni—In, Ni—Ge, Ni—Se, Ni—La, Ni—W, Ni—Ti, Ni—P, Ni—Mo, and Ni—Ga. Preferably, the steel plate is plated with the above alloys in a thickness of 0.5 μm–5 μm. As shown in FIGS. 2 and 3, the addition of an organic substance increases the hardness and allows the outer surface of the battery can to have a fine outlook and damage-resistant property. Thus, preferably, the plating bath to be used to plate the side of the steel plate corresponding to the outer surface of the battery can contains a smaller amount of organic substance than the plating bath to be used to plate the side of the steel plate corresponding to the inner surface thereof.

The steel plate plated with the alloy at step #3 is plated with a selected metal having a small contact electric resistance at step #4 to reduce the contact electric resistance of the inner surface which is brought into contact with carbon or positive pole substance (active substance) characteristic (high rate characteristic) of the battery.

In order to achieve the above object, in the fourth embodiment, the steel plate plated with the Ni—Mn alloy of the first embodiment was flash-plated in the following condition to form an Ag-plated layer in a thickness of 0.05 μm. The plating bath consisted of 200 g/liter of Dainesilver (trade name)-AGM-15 (manufactured by Daiwa Kasei Co., Ltd.), 500 g/liter of Dainesilver-AGI, and 25 g/liter of Dainesilver-AGH. The steel plate was flash-plated with Ag at 40° C.–50° C., 4 in pH, and 1 A/dm² in current density.

Using the steel plate plated with the Ni—Mn alloy and flash-plated with Ag, battery cans in the same shape were formed by transfer drawing method, similarly to the first embodiment. 30 μm of carbon was applied to the inner surface of the side wall of battery can. Then, the contact electric resistance of battery can was compared with the contact electric resistance of a battery can not flashed with Ag. As a result, the contact electric resistance of the former was 1/2.2 as small as that of the latter.

The steel plate which is plated with the alloy at step #3 can be selected from the three kinds (four kinds if steel plate in combination of second and third ones) of steel plates shown in FIG. 1. Further, as finish state of the three kinds of the steel plate, one of the three kinds of finish states is selected.

Of the three kinds of finish states, the second case in which one surface of the steel plate is processed to a mirror-like surface finish and the other surface thereof is processed into a rough surface finish can be most favorably adopted. That is, the steel plate is passed between a pair of rolling rollers, the upper one of which is polished with a grindstone, and the lower of which is a bright. As the steel plate is passed between a pair of rolling rollers, one surface thereof is rough and the other surface thereof is mirror-like surface.

Thus, in the fifth embodiment, a steel plate having one surface thereof processed to be mirror-like and the other surface thereof rough was used. More specifically, the steel plate having a thickness of 0.25 μm was passed between a pair of rolling rollers, the upper one of which was polished with grindstone and the lower one of which was a bright roller so that the upper surface of the steel plate had a rough surface having a roughness degree of Ra 0.5 μm.

At step #3, the steel plate was plated with the Ni—Mn alloy similar to that of the first embodiment. At step #4, the steel plate was plated with Ag. At step #5, the steel plate was annealed. At step #6, the steel plate was rolled to temper it. Cylindrical battery cans, each having the bottom wall, similar to that of the first embodiment were formed of the battery can-forming plate by transfer drawing method and DI method at step #7.

In transfer drawing method, the inner surface of the side wall of the battery can had a roughness degree of Ra 7.8 μm, while in DI method, the inner surface of the side wall of the battery can had a roughness degree of Ra 0.47 μm and was cracked randomly lengthwise, widthwise, and obliquely.

As described previously, the steel plate having mirror-like surfaces on both surfaces at step #1 can be processed so that the inner surface of the side wall of the battery can is rough and cracked, by forming an alloy-plated layer thereon at step #3. Further, a steel plate (dull material), both surfaces of which are rough can be processed so that the inner surface of the side wall of the battery can is rough and cracked.

As shown in FIG. 1, as the steel plates (first, second, and third steel plates) serving as the material of the battery can of the present invention, the first plate consists of the conventional plate for example, steel plates of T-1 and T-2 of JIS G 3303 used as a battery can-forming plate; the second material consists of high yield strength steel plates of T-3 through T-5 and DR-8 through DR-10 of JIS G 3303 having mechanical characteristics that the YP (yielding point) thereof is not less than 250 N/mm² and not more than 700 N/mm² and the HR30T (hardness) thereof is not less than 55 and not more than 80; the third material consists of steel plates having a grain size of 10–12 obtained by overaging treatment or consists of steel plates composed of flat crystal grains having the grain size of 10–12 and arranged in rows linearly.

Figure 8:
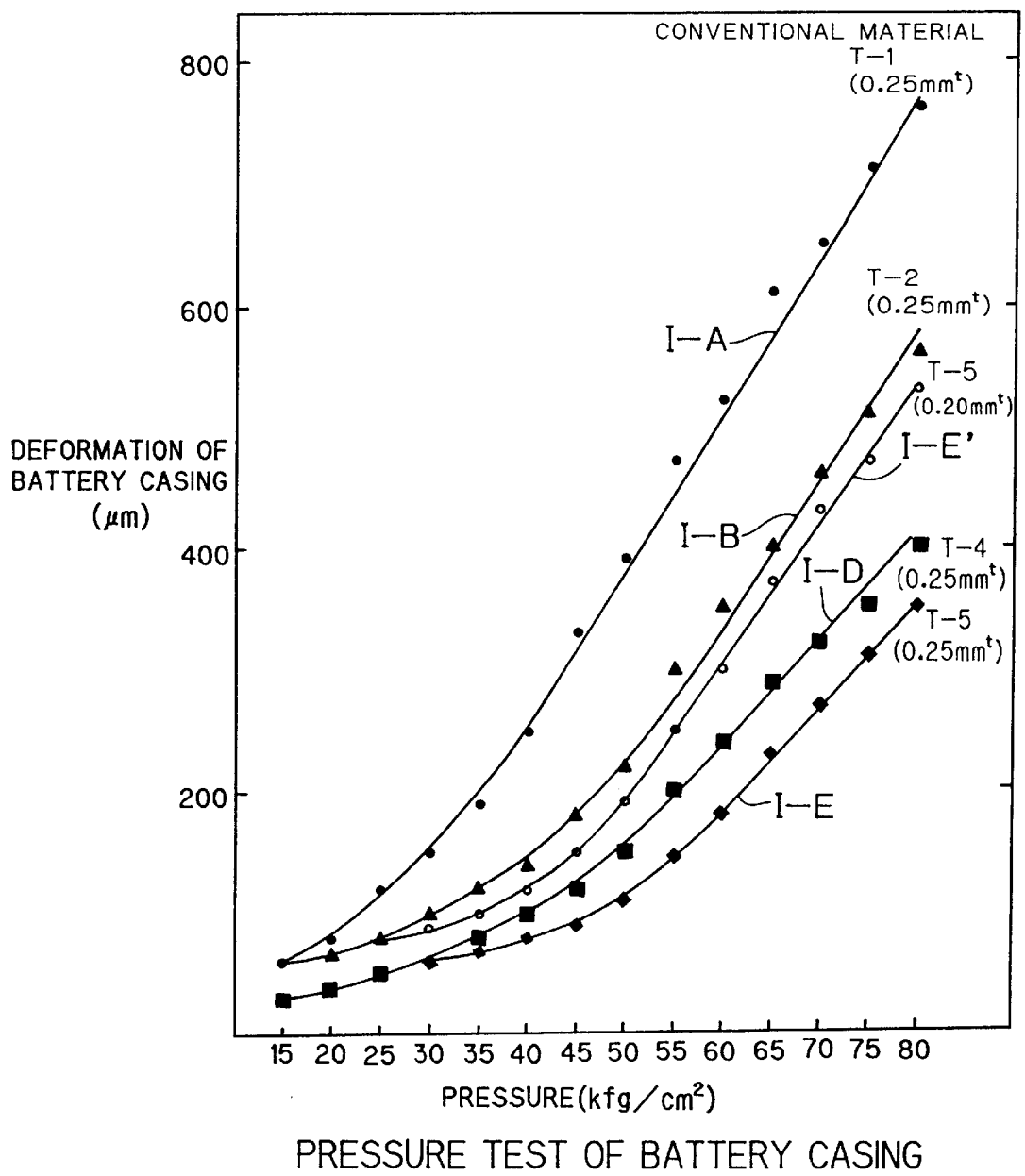
FIG. 8 is a diagram showing results of strength tests of a high yield strength steel plate and a steel plate for use in a conventional battery can.

The high yield strength steel plate, namely, the above-described second steel plates T-3–T-5, DR-8–DR-10 of JIS G 3303 which are used as the material of the battery can have not been hitherto used as a battery can-forming plate. According to the inventors' experiments, the high yield strength steel plate can be processed into the battery can having a strength and a yield strength almost equal to those of the conventional steel plates of T-1 and T-2 even though the thickness of the former is reduced by more than 20% than that of the latter. FIG. 8 shows the result of strength comparison test of battery cans formed of the conventional steel plates of T-1 and T-2 and of the high yield strength steel plates of T-5, T-4, and DR-8. As indicated in FIG. 8, the strengths of the high yield strength steel plates of T-5 and DR-8 having a thickness of 0.2 mm is greater than that of the conventional steel plates of T-1 having a thickness of 0.25 mm. Accordingly, supposing that the reduction percentage of the thickness of the side wall of the battery can formed of the high yield strength steel plates relative to that of the bottom wall thereof (thickness of material) is equal to the reduction percentage of the thickness of the side wall of the battery can formed of the conventional steel plates relative to that of the bottom wall thereof, the thickness of the side wall of the battery can formed of the former can be allowed to be thinner than that of the side wall of the battery can formed of the latter. Supposing that the thickness of the side wall of the battery can formed of the former is equal to that of the side wall of the battery can formed of the conventional steel plates, thickness of the bottom wall (thickness of material) thereof can be allowed to be thinner than the thickness of the bottom wall thereof. Thus, the thickness reduction percentage of the thickness of the side wall of the battery can formed of the former relative to that of the bottom wall thereof (thickness of material) can be allowed to be lower than that of the thickness of the side wall of the battery can formed of the latter relative to that of the bottom wall thereof. Therefore, the steel plate of the present invention is drawn at a smaller number of time and thus can be processed at a higher speed than the conventional one.

Table 5 shows reduction percentages of various thicknesses of the conventional steel plates of T-1 and T-2 and those of various thicknesses of the steel plates of T-3–T-5 having a thickness smaller by 20% than that of the conventional steel plates of T-1 and T-2 and having the same strength as that of the conventional steel plates of T-1 and T-2. Using drawing process, battery cans were formed of the conventional steel plates of T-1 and T-2 and the steel plates of T-3–T-5 by setting the thickness of the side wall of the battery can formed of the former to be equal to that of the side wall of the battery can of the latter.

inner and outer surfaces in press drawing operation, and as a result, the rough outer surface has an unfavorable corrosion-resistant property. In order to solve this problem, as a result of energetic researches, the present inventors have found that when a steel plate has a grain size of 10 or more, a plated layer has a favorable follow-up with the elongation of the steel plate during the press drawing operation. Consequently, the battery can has a glossy surface and a high degree of corrosion resistance. The grain size of 10–12 can be accomplished as follows: After a steel plate slab is cast, the cast steel plate is hot-rolled. Then, the hot-rolled plate is cold-rolled. Then, the cold-rolled steel plate is annealed and subjected to overaging treatment to make the grain size of the steel plate fine, with the grain size of the steel plate kept at 10–12. Then, the steel plate is rolled by applying a high pressure thereto. As a result, crystal grains are flattened and arranged linearly in rows. It was confirmed that a superior battery can-forming plate can be manufactured when the steel plate is plated thereafter.

The process of manufacturing the steel plate having the grain size of 10–12 is performed as follows: The cast slab is hot-rolled at 1,200° C. to process the hot-rolled steel plate into a hot-drawn steel plate having a thickness of 2.45 mm at a finish temperature of 750° C. Then, immediately, the hot-drawn steel plate is cooled at an average cooling speed of 40° C./s and wound around a roll at 570° C. Then, the steel plate is cleaned in acid water and then, cold-rolled at a rolling percentage of 87.6% to form a cold-rolled steel plate having a thickness of 0.305 mm. Then, the cold-rolled steel plate is subjected to averaging treatment to return the

TABLE 5

| Conventional steel plate (T1, T2) | | | | High yield strength steel plate (T3, 4, 5) | | | |
| --- | --- | --- | --- | --- | --- | --- | --- |
| Thickness (mm) | Reduced amount (mm) of thickness | Reduction percentage of thickness | Thickness (mm) of side wall of battery can | Thickness (mm) | Reduced amount (mm) of thickness | Reduction percentage of thickness | Thickness (mm) of side wall of battery can |
| 0.50 | 0.28 | 56 | 0.22 | 0.40 | 0.18 | 45 | 0.22 |
| 0.45 | 0.25 | 55.6 | 0.20 | 0.36 | 0.16 | 44.4 | 0.20 |
| 0.40 | 0.22 | 55 | 0.18 | 0.32 | 0.14 | 43.8 | 0.18 |
| 0.35 | 0.17 | 48.6 | 0.18 | 0.28 | 0.10 | 35.7 | 0.18 |
| 0.30 | 0.12 | 40 | 0.18 | 0.24 | 0.06 | 25 | 0.18 |
| 0.25 | 0.07 | 28 | 0.18 | 0.20 | 0.05 | 25 | 0.15 |
| | | | | 0.16 | 0.06 | 37.5 | 0.10 |
| | | | | 0.12 | 0.02 | 16.7 | 0.10 |

As shown in table 5, when the side wall of a battery can formed of the steel plates of T-3–T-5 having a thickness of 0.24 mm is reduced to 0.18 mm, the thickness reduction percentage is 25%. In order to the steel plates of T-1 and T-2 to have a high yield strength almost equal to that of the steel plates T-3–T-5, the steel plates of T-1 and T-2 are required to have a thickness of 0.30 mm. When the thickness of the side wall formed of the steel plates of T-1 and T-2 is set to 0.18 mm, the thickness reduction percentage of the steel plates of T-1 and T-2 is 40%. That is, the thickness of the conventional steel plate is required to be reduced by 40%, whereas the thickness of the steel plate of the present invention having a high yield strength is required to be reduced by only 25%.

Description is made on the above-described third steel plate having the grain size of 10–12 obtained by overaging treatment or the steel plate composed of flat crystal grains having the grain size of 10–12 and arranged in rows linearly.

Figure 9A:
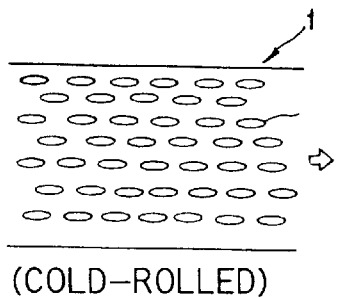
FIGS. 9A, 9B, 9C, and 9D are views showing deformation state of crystal grains of a steel plate.
Figure 9B:
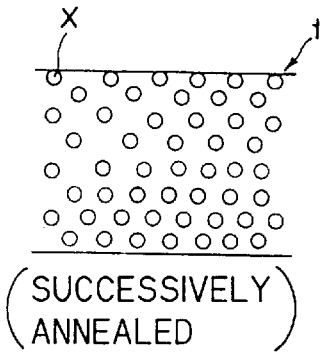
Figure 9C:
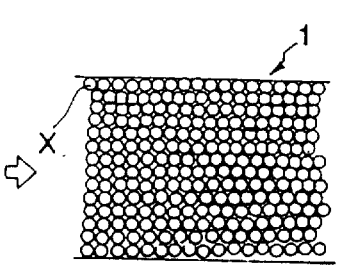

When the conventional steel plate having a grain size not more than 10 is used, the battery can is likely to have rough tissues of crystal grains X flattened as shown in FIG. 9A to spherical shape as shown in FIG. 9B and make the grain tissue finer as shown in FIG. 9C and arrange them in rows linearly.

Annealing processing method includes successive annealing method and batch annealing method. The physical characteristic of the steel plate annealed by the successive annealing method is greatly different from that of the steel plate annealed by the batch annealing method. That is, in the case where steel plates are annealed in a short period of time of one–two minutes by successively feeding them to an annealing oven having a high temperature of 650° C., the elongation percentage of the steel plate is 25%–27%, with the result that the shape of crystal grains are changed. In the case where steel plates are annealed in a long period of time of about seven hours by an annealing oven having a high temperature of 450° C., the elongation percentage of the steel plate is 27%–30%, with the result that the shape of crystal grains are changed. By selecting the annealing temperature and annealing method (successive annealing and/or batch annealing), flattened crystal grains in rows linearly as shown in FIG. 9A are changed to be arranged in rows linearly and the grain tissues are made to be small as shown in FIG. 9C. For example, initially, the steel plate is annealed successively for one minute at 640° C. to obtain a state as shown in FIG. 9B and then, the steel plate is annealed successively for one minute at 640° C. to obtain the state as shown in FIG. 9B. Then, the batch annealing is performed at 450° C. for seven hours to obtain the state as shown in FIG. 9C. After the overaging treatment, the steel plate is rolled for tempering at a rolling percentage of about 1.6%.

The hardness of a steel plate obtained by the above manufacturing process is HV110 equivalent to ⅛ specified by JIS G 3141 and has a grain size 11 specified by JIS G 0552.

Figure 9D:
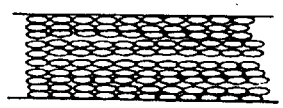

When the rolling for tempering which is performed after the overaging treatment is replaced with a method of rolling the steel plate at a great rolling percentage of 30%–60%, as shown in FIG. 9D, crystal grains X having the grain size of 10–12 become flattened crystal grains XX arranged in rows linearly. Thus, the crystal grains XX look linear.

Figure 10A:
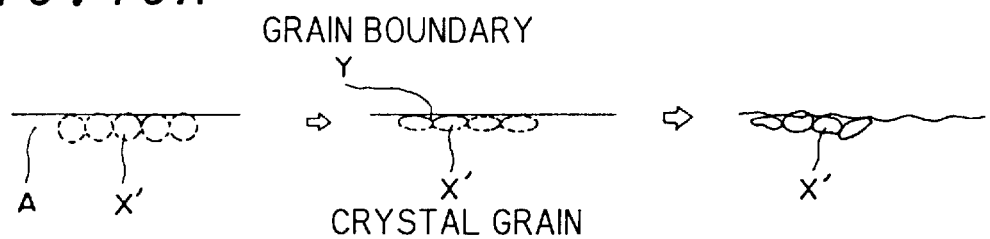
FIGS. 10A and 10B are views showing deformation state of crystal grains during press processing operation.
Figure 10B:

The steel plate having a grain size 11 was plated with the Ni—Mn alloy of the first embodiment to form a battery can by transfer drawing method. When a steel plate (blank) is drawn into a shallow cylinder (B), the crystal grains X of the steel plate are elongated in the drawing direction as shown in FIG. 10A. Because the crystal grains X are very small and the grain tissues are fine, the elongation of crystal grains X' and that of the grain boundary are low. Thus, when the side wall of the battery can is drawn to shape the shallow cylinder (B) into a deep cylinder (C), the degree of warp of the crystal grains X' is small and hence the surface of the steel plate is not roughened. Therefore, the alloy-plated layer applied to the surface of the steel plate follows the state of the surface thereof, thus providing a battery can having a glossy outer surface and high corrosion-resistant property. Because the inner surface of the side wall of the battery can is plated with the Ni—Mn alloy having a high hardness, the inner surface of the side wall is roughened and cracked in transfer drawing, similarly to the first embodiment.

As the press drawing method at step #7 shown in FIG. 1, one of the following three methods is adopted: Transfer drawing method (first method), DI method (second method), and the method (third method) of passing a steel plate through an ironing and drawing die after transfer drawing method is performed. The third method is novel.

Figure 6B:
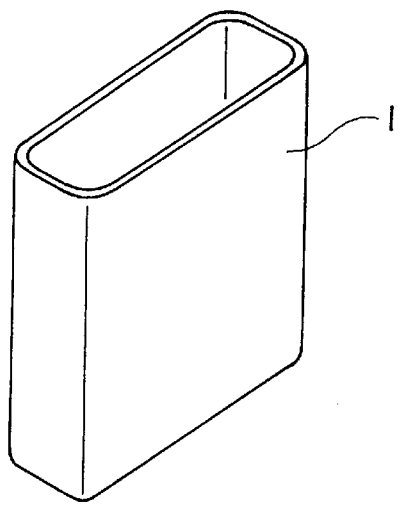
FIG. 6B is a perspective view showing a rectangular cylindrical battery can.
Figure 11A:
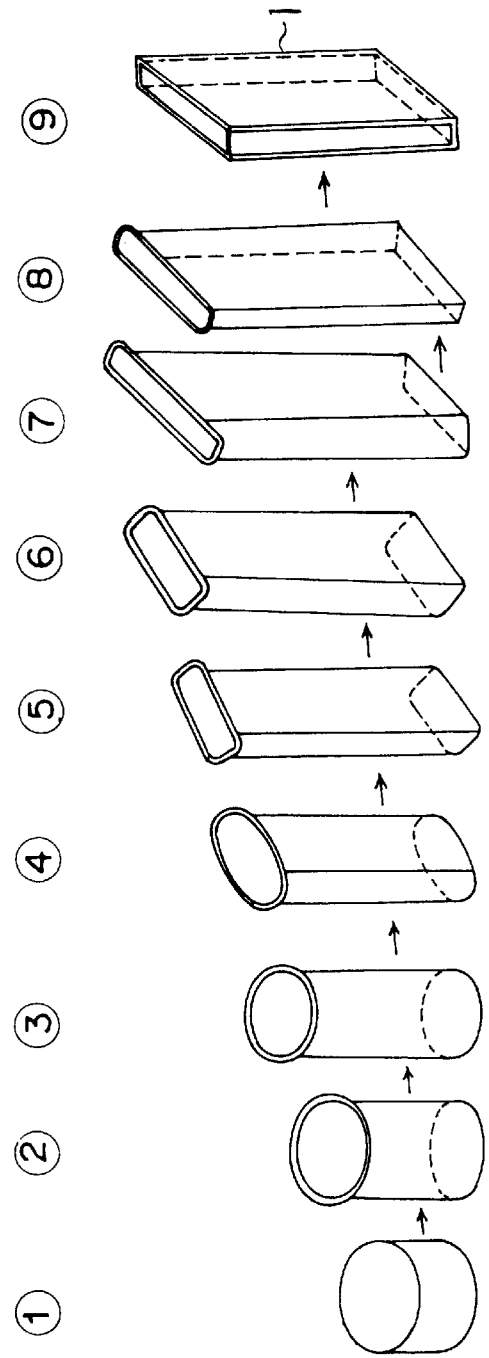
FIGS. 11A and 11B are views showing a method of processing a steel plate into a rectangular cylindrical battery can by a third drawing method.
Figure 11B:
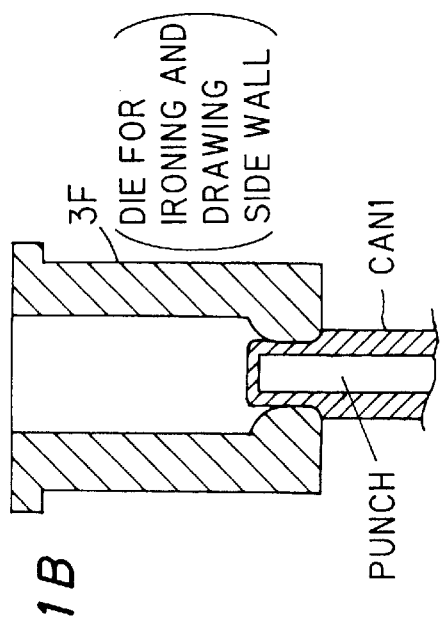

FIG. 11 shows the third method. In this method, after transfer drawing method is performed, the steel plate is passed through an ironing and drawing die 3F for ironing and drawing the side wall to make the side wall thinner than the bottom wall of the battery can. In the transfer drawing method, the steel plate in the form of blank is processed shallow cylinder deep cylinder elliptic cylinder rectangular cylinder to obtain a rectangular cylindrical battery can 1 shown in FIG. 6B.

In DI method, the inner and outer surfaces of the steel plate are processed into mirror-like surface finish. Thus, it is difficult to roughen and crack the inner surface of the battery can formed of the steel plate. Even though the inner surface is roughened or cracked, the degree of roughness and crack is small. In transfer drawing method, it is easy to roughen and crack the inner surface of the battery can formed of the steel plate. In transfer drawing method, however, the thickness of the side wall is almost equal to that of the bottom wall and it is difficult to make the side wall of the battery can thin. In the third method, after transfer drawing method is performed, the steel plate is passed through an ironing and drawing die for ironing and drawing the side wall to make the side wall thinner than the bottom wall of the battery can with the crack and roughness formed by the transfer drawing method left on the inner surface of the side wall of the battery can.

In transfer drawing, the steel plate is transferred to a plurality of drawing dies by changing the shape thereof from cylindrical shape→elliptic cylinder→rectangular cylinder. Thus, a desired rectangular cylindrical battery can can be formed. In DI method, it is very difficult and practically impossible to form a rectangular cylindrical battery can.

As described previously, in the process shown in FIG. 1, steps #1 through #7 are used selectively and in combination. But the following operation at step #3 is essential, the operation is that a steel plate is plated with an alloy and the hardness of the alloy to be applied to one surface of the steel plate is differentiated from that of the alloy to be applied to the other surface thereof. Thus, it is possible to roughen and crack the inner surface of the side wall of the battery can formed of a conventional steel plate and form a mirror-like surface on outer surface of the steel plate by differentiating the hardness of the alloy to be applied to one surface of the steel plate from that of the alloy to be applied to the other surface thereof.

As the most favorable process of the present invention, using the high yield strength steel plate having the grain size of 10–12 and having a mirror-like surface on one side and a rough surface on the other side, at step #2, the steel plate is struck, at step #3, the steel plate is plated with an alloy at step #4, the steel plate is plated with a metal having a low contact electric resistance; at step #5, the steel plate is annealed; at step #6, the steel plate is rolled to temper it to form a battery can-forming material; and at step #7, after transfer drawing method is performed, the steel plate is passed through an ironing and drawing die for ironing and drawing the side wall.

As apparent from the foregoing description, according to the present invention, the hardness of the alloy-plated layer formed on the one surface of a steel plate is different from that of the alloy-plated layer formed on the other surface thereof, and a hardness of one surface corresponding to inner surface of a battery can is higher than that of outer surface thereof, so that battery can formed of the steel plate has a roughened and cracked inner surface when the steel plate is drawn. Therefore, the inner surface of the battery can makes a close contact with carbon or an active substance which is charged into the battery can, thus improving the characteristic (high rate characteristic) of the battery. In addition, the battery can has a mirror-like outer surface, thus having corrosion-resistant and damage-resistant properties on the outer surface thereof.

Using the high yield strength steel plate, the thickness of the battery can can be allowed to be thin, which increases the volume of the battery can and increases the charge amount of electrodes into the battery can. Consequently, the battery can is allowed to have a long life and further, the material cost can be reduced.

Using the high yield strength steel plate having a grain size of 10–12, the steel plate is not roughened when it is drawn. Thus, the battery can has a mirror-like outer surface and an improved appearance, corrosion-resistant property, and damage-resistant property.

Further, the side of the steel plate corresponding to the inner side of the battery can is plated with a metal having a low contact resistance such as Ag to reduce in the contact resistance between the inner surface and an active substance and carbon and the internal resistance of the battery, therefore, the performance of the battery can be improved.

Furthermore, both surfaces of the steel plate are processed so that one surface thereof is rough and the other surface thereof is mirror-like to use the rough surface as the inner surface of the battery can and use the mirror-like surface as the outer surface thereof. By adopting this construction, the plated layer formed on the inner surface of the battery can ensure roughened and cracked and the plated layer formed on the outer surface thereof ensure formed as a mirror-like surface.

Further, in performing press drawing method using the battery can-forming plate of the present invention, regardless of whether any one of the three methods, namely, transfer drawing method; DI method; and a method of passing the steel plate through the die for ironing and drawing the portion of the steel plate corresponding to the side wall of the battery can after the steel plate is drawn by transfer drawing method, the battery can has a roughened and cracked inner surface and a mirror-like outer surface. Thus, the drawing method is not limited to one of the above three methods, but any desired method can be selected from the three methods.

Because the battery can of the present invention has the roughened and cracked inner surface, as described previously, the inner surface of the battery can makes a close contact with carbon or an active substance which is charged into the battery can, thus improving the characteristic.

Further, the battery can of the present invention, the bottom wall is required to have a required thickness to withstand the pressure inside the battery can. Because the thickness of the side wall is set to be smaller than that of the bottom wall, it is possible to increase the volume of the battery can and increase the charge amount of an active substance which is charged into the battery can. Thus, the battery can has an improved characteristic.

What is claimed is:

1. A battery can-forming plate consisting of a steel plate plated with a nickel alloy, wherein a hardness of a nickel alloy plated layer formed on one surface of the steel plate is higher than that of a nickel alloy plated layer formed on the other surface thereof; the nickel alloy plated layer having a higher hardness is used as an inner surface of a battery can and the nickel alloy plated layer having a lower hardness is used as an outer surface thereof in forming the battery can; and the hardnesses of the nickel alloy plated layers are differentiated from each other by containing a different metal.

2. The battery can-forming plate according to claim 1, wherein the alloy is selected from Ni—Mn, Ni—Go, Ni—Fe, Ni—Sn, Ni—Zn, Ni—B, Ni—Si, Ni—In, Ni—Ge, Ni—Se, Ni—Ln, Ni—W, Ni—Ti, Ni—P, Ni—Mo, and Ni—Ga.

3. The battery can-forming plate according to claim 1, wherein the steel plate that is plated with the alloy consists of a high yield strength steel plate having characteristics that the YP (yielding point) thereof is not less than 250 N/mm² and not more than 700 N/mm² and that the HR30T (hardness) thereof is not less than 55 and not more than 80.

4. The battery can-forming plate according to claim 1, wherein a crystal grain size of the steel plate plated with an alloy is in a range of 10–12.

5. The battery can-forming plate according to claim 4, the crystal grain is flat and arranged in rows linearly.

6. The battery can-forming plate according to claim 1, wherein the surface of the plated layer having the higher hardness is plated with a metal selected from Au, Ag, Mo, Co, Ir, Rh, W, and Zn having a small contact electric resistance.

7. The battery can-forming plate according to claim 1, wherein one surface of the steel plate is processed as a rough surface, whereas the other surface thereof is processed as a mirror-like surface; and the plated layer having the higher hardness is formed on the rough surface, and the plated layer having the lower hardness is formed on the mirror-like surface.

8. The battery can-forming plate according to claim 7, wherein the roughness of the rough surface is in a range of Ra 10 µm to 0.15 µm.

9. The battery can according to claim 1, wherein a strike plating layer is formed between the alloy-plated layer and the steel plate.

10. A battery can consisting of a nickel alloy-plated steel plate, wherein a hardness of a nickel alloy plated layer formed on one surface of the steel plate is higher than that of a nickel alloy plated layer formed on the other surface thereof; the nickel alloy plated layer having a higher hardness is used as an inner surface of a battery can and the nickel alloy plated layer having a lower hardness is used as an outer surface thereof in forming the battery can; and the hardnesses of the nickel alloy plated layers are differentiated from each other by containing a different metal, and wherein cracks generated in a random direction in press processing are formed on a plated layer formed on an inner surface of a side wall of the battery can.

11. A battery can according to claim 10, wherein a shape of the battery can is a cylindrical shape or a rectangular cylindrical shape.

12. The battery can according to claim 10, wherein a thickness of the side wall and that of the plated layer formed thereon are smaller than that of the bottom wall and that of the plated layer formed thereon, respectively.

13. A battery comprising a battery can consisting of a steel plate plated with a nickel alloy, wherein a hardness of a nickel alloy plated layer formed on one surface of the steel plate is higher than that of a nickel alloy plated layer formed on the other surface thereof; the nickel alloy plated layer having a higher hardness is processed as a rough surface and used as an inner surface of a battery can and the nickel alloy plated layer having a lower hardness is processed as a mirror-like surface and used as an outer surface thereof; and the hardnesses of the nickel alloy plated layers are differentiated from each other by containing a different metal.

14. A battery can-forming plate consisting of a steel plate plated with a nickel alloy comprised of nickel and a metal other than nickel, wherein a hardness of a nickel alloy plated layer formed on one surface of the steel plate is higher than that of a nickel alloy plated layer formed on the other surface thereof; the nickel alloy plated layer having a higher hardness is used as an inner surface of a battery can and the nickel alloy plated layer having a lower hardness is used as an outer surface thereof in forming the battery can; and the hardnesses of the nickel alloy plated layers are differentiated from each other by having different percentages of the metal other than nickel.

15. The battery can-forming plate according to claim 14, wherein the alloy is selected from Ni—Mn, Ni—Go, Ni—Sn, Ni—Zn, Ni—B, Ni—Si, Ni—In, Ni—Ge, Ni—Se, Ni—La, Ni—W, Ni—Ti, Ni—P, Ni—Mo, and Ni—Ga.

16. The battery can-forming plate according to claim 14, wherein the alloy is Ni—Fe.

17. A battery comprising a battery can consisting of a nickel alloy-plated steel plate, wherein a hardness of a nickel alloy plated layer comprised of nickel and a metal other than nickel formed on one surface of the steel plate is higher than that of a nickel alloy plated layer comprised of nickel and a metal other than nickel formed on the other surface thereof; the nickel alloy plated layer having a higher hardness is used as an inner surface of a battery can and the nickel alloy plated layer having a lower hardness is used as an outer surface thereof in forming the battery can; and the hardnesses of the nickel alloy plated layers are differentiated from each other by having different percentages of the metal other than nickel, and wherein cracks generated in a random direction in press processing are formed on a plated layer formed on an inner surface of a side wall of the battery can.

18. A battery comprising a battery can consisting of a steel plate plated with a nickel alloy comprised of nickel and a metal other than nickel, wherein a hardness of a nickel alloy plated layer formed on one surface of the steel plate is higher than that of a nickel alloy plated layer formed on the other surface thereof; the nickel alloy plated layer having a higher hardness is processed as a rough surface and used as an inner surface of a battery can and the nickel alloy plated layer having a lower hardness is processed as a mirror-like surface and used as an outer surface thereof; and the hardnesses of the nickel alloy plated layers are differentiated from each other by having different percentages of the metal other than nickel.

19. A battery can-forming plate consisting of a steel plate plated with an alloy selected from Co—Mo, Fe—W, and Ag—Se, wherein a hardness of a plated layer formed on one surface of the steel plate is higher than that of a plated layer formed on the other surface thereof; and the plated layer having a higher hardness is used as an inner surface of a battery can and the plated layer having a lower hardness is used as an outer surface thereof in forming the battery can.

20. A battery can-forming plate consisting of a steel plate plated with an alloy selected from Ni—Mn, Ni—Co, Ni—Sn, Ni—Zn, Ni—B, Ni—Si, Ni—In, Ni—Ge, Ni—Se, Ni—Ln, Ni—W, Ni—Ti, Ni—P, Ni—Mo, Ni—Ga, wherein a hardness of a plated layer formed on one surface of the steel plate is higher than that of a plated layer formed on the other surface thereof; and the plated layer having a higher hardness is used as an inner surface of a battery can and the plated layer having a lower hardness is used as an outer surface thereof in forming the battery can.

21. A battery can-forming plate consisting of a steel plate plated with a nickel alloy, wherein a hardness of a nickel alloy plated layer formed on one surface of the steel plate is higher than that of a nickel alloy plated layer formed on the other surface thereof; the nickel alloy plated layer having a higher hardness is used as an inner surface of a battery can and the nickel alloy plated layer having a lower hardness is used as an outer surface thereof in forming the battery can; and the hardnesses of the nickel alloy plated layers are differentiated from each other by having different percentages of a metal other than nickel, or by containing a different metal, and wherein the surface of the plated layer having the higher hardness is plated with a metal selected from Au, Ag, Mo, Co, If, Rh, W, and Zn having a small contact electric resistance.

* * * * *